(12) United States Patent
Guy

(10) Patent No.: US 6,980,715 B2
(45) Date of Patent: Dec. 27, 2005

(54) FIBER OPTIC ROTARY JOINT AND METHOD THEREFOR

(75) Inventor: James Kevan Guy, Mesa, AZ (US)

(73) Assignee: The Boeing Company, Chicago, IL (US)

(*) Notice: Subject to any disclaimer, the term of this patent is extended or adjusted under 35 U.S.C. 154(b) by 170 days.

(21) Appl. No.: 10/674,014

(22) Filed: Sep. 29, 2003

(65) Prior Publication Data

US 2005/0069250 A1    Mar. 31, 2005

(51) Int. Cl.[7] ............................................. G02B 6/42
(52) U.S. Cl. ..................................... 385/26; 385/32
(58) Field of Search .................... 385/25–32; 310/231, 310/232

(56) References Cited

U.S. PATENT DOCUMENTS

| | | | |
|---|---|---|---|
| 3,599,115 A | | 8/1971 | Beezley |
| 4,027,945 A | * | 6/1977 | Iverson .......................... 385/26 |
| 4,953,932 A | * | 9/1990 | Mihich ......................... 385/26 |
| 5,487,619 A | | 1/1996 | Winebrenner |
| 5,602,948 A | | 2/1997 | Currie |
| 5,631,625 A | | 5/1997 | Moergelin et al. |
| 5,691,696 A | | 11/1997 | Mazies et al. |
| 5,877,681 A | | 3/1999 | Williams et al. |
| 6,582,114 B1 | | 6/2003 | Guy et al. |

FOREIGN PATENT DOCUMENTS

WO    WO 99/39135    8/1999

* cited by examiner

Primary Examiner—Phan T. H. Palmer
(74) Attorney, Agent, or Firm—Harness Dickey & Pierce P.L.C.

(57) ABSTRACT

An optical coupling assembly for coupling an output from a first optical fiber bundle to a second optical fiber bundle, where the two optical fiber bundles are moving relative to one another, and without any physical contact or electronic components being required to effect the optical coupling therebetween. A first annular member receives an input optical fiber bundle and presents outermost ends of the individual optical fibers of the first bundle in a circular arrangement that forms a first face portion. A second annular coupling member receives the outermost ends of a second optical fiber bundle that presents the outermost ends in a circular arrangement to form a second face portion. The coupling members are supported in longitudinal alignment with one another such that the two face portions are in facing relationship. Optical signals are coupled from the first coupling member to the second coupling member without any external electronics or associated circuitry being required to affect the optical coupling. This enables an optical coupling to be effected between a stationary optical fiber bundle and a moving optical fiber bundle when the two optical fiber bundles are arranged around one or more shaft portions that prevent the area occupied by the shaft portion(s) to be used to effect an optical coupling.

18 Claims, 5 Drawing Sheets

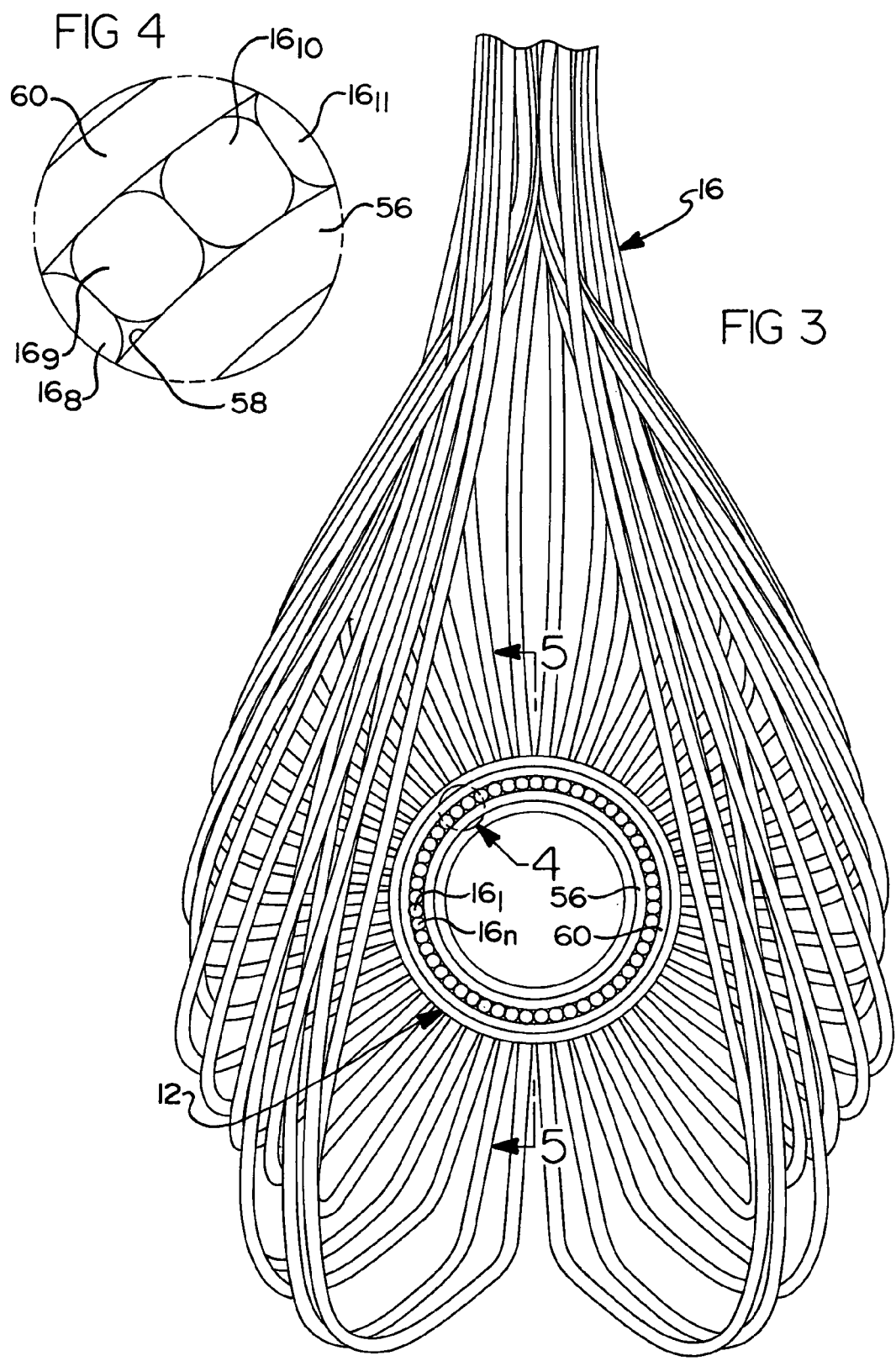

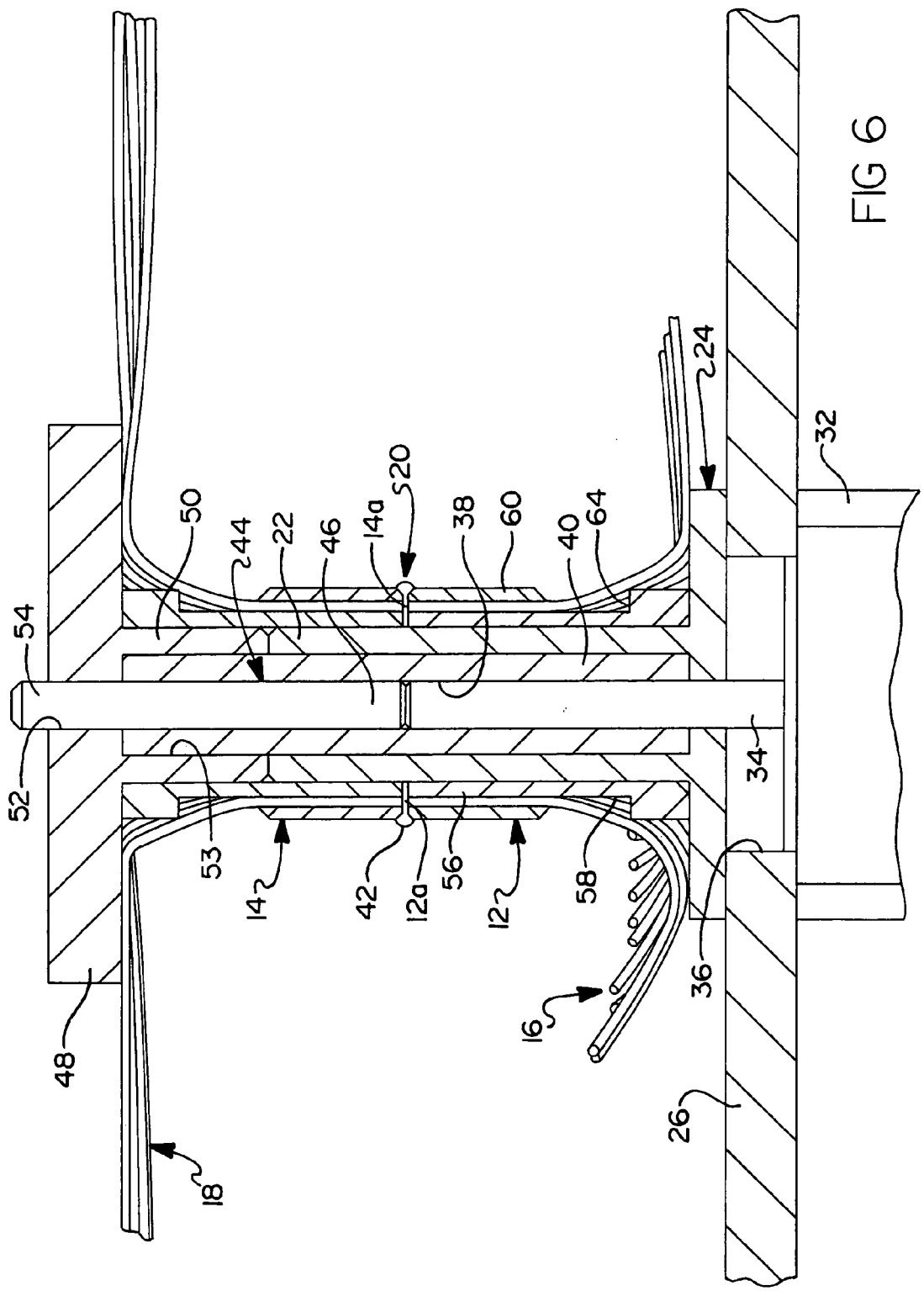

FIBER OPTIC ROTARY JOINT AND METHOD THEREFOR

FIELD OF THE INVENTION

The present invention relates to optical coupling assemblies, and more particularly to a fiber optic rotary joint for coupling a non-rotating fiber optic or fiber optic bundle with a rotating fiber optic or fiber optic bundle.

BACKGROUND OF THE INVENTION

Fiber optic coupling devices are used in a wide variety of applications to couple an optical signal from one optical fiber, or optical fiber bundle, to another optical fiber or optical fiber bundle. Some such coupling assemblies convert the optical signal into an equivalent electrical signal and then back into an optical signal to achieve coupling between two optical fibers or two optical fiber bundles. Obviously, this adds complexity and cost to the coupling assembly.

An especially challenging situation is where a fiber optic bundle is arranged around a non-rotating member, such as along a non-rotating shaft, and a second optical fiber bundle is arranged along a rotating shaft disposed longitudinally in line with the non-rotating shaft. In this instance, the area defined by each shaft cannot be used as optical paths or to house components used for this purpose. Thus, the optical coupling between the two fiber optic bundles must take place along the periphery of the two shafts, and further in a manner which does not inhibit rotation of one of the shafts relative to the other.

SUMMARY OF THE INVENTION

The present invention is directed to an optical coupler assembly which allows an optical coupling to be formed between a first optical fiber or optical fiber bundle disposed on the periphery of a first component, and a second optical fiber or optical fiber bundle disposed on the periphery of a second component. In one preferred embodiment a first annular member forming a collar is used to hold a first plurality of optical fibers in a circular, or at least partial circular, arrangement such that outermost ends of the first optical fibers are presented along a path generally parallel to a longitudinal axis of the first annular member. A second annular member is used to hold a second plurality of optical fibers in a circular orientation or a partial circular orientation, and further such that outermost ends of the second optical fibers are presented along a path parallel to the longitudinal axis of the second annular member. In one preferred implementation the first and second annular members have a common diameter so that the outermost ends of each of the first optical fibers and each of the second optical fibers are facing one another when the first and second annular members are assembled to one another, but are not making physical contact.

In one preferred implementation, the first annular member is fixedly coupled to a support structure so as to be non-movable. The second annular member, however, is supported along a rotationally moving structure. Optical input signals input into the first optical fibers are transmitted to the outermost ends of the first optical fibers and are able to be coupled into the outermost ends of the second optical fibers as the second annular member rotates. Accordingly, no physical contact occurs between the first optical fibers and the second optical fibers. Furthermore, the present invention allows the optical coupling between the first and second groups of optical fibers to be accomplished without implementing any electrical components that require the optical signal from the first group of optical fibers to be converted from an optical to an electrical signal, and then back into an optical signal.

The present invention has particular utility for those applications where a fiber optic coupling must be made between a non-rotating component and a rotating component, and particularly where each of the rotating and non-rotating components comprise a shaft that precludes the forming of an optical path within the area defined by the two shafts.

While the present invention is particularly well adapted to be used to form an optical coupling between two fiber optical bundles, it will be appreciated that the invention could just as easily be used to form a coupling between a single optical fiber disposed adjacent a non-rotating component, and an optical fiber bundle or a single optical fiber disposed along a second rotating component. Still further, the invention could just as readily be used to form an optical coupling between two rotating components that rotate at different speeds or at different directions.

BRIEF DESCRIPTION OF THE DRAWINGS

The present invention will become more fully understood from the detailed description and the accompanying drawings, wherein:

FIG. 3 is a plan view looking straight down on the fixed annular member to illustrate the circular arrangement in which the face portions of each optical fiber bundle are arranged;

FIG. 4 is an enlarged view of a portion of the fixed annular member of FIG. 3 illustrating how the outermost ends of the optical fibers are compacted;

FIG. 6 is a cross-sectional side view of the apparatus of FIG. 1, taken in accordance with section line 6—6 in FIG. 1.

DETAILED DESCRIPTION OF THE PREFERRED EMBODIMENTS

The following description of the preferred embodiment(s) is merely exemplary in nature and is in no way intended to limit the invention, its application, or uses.

Figure 1:
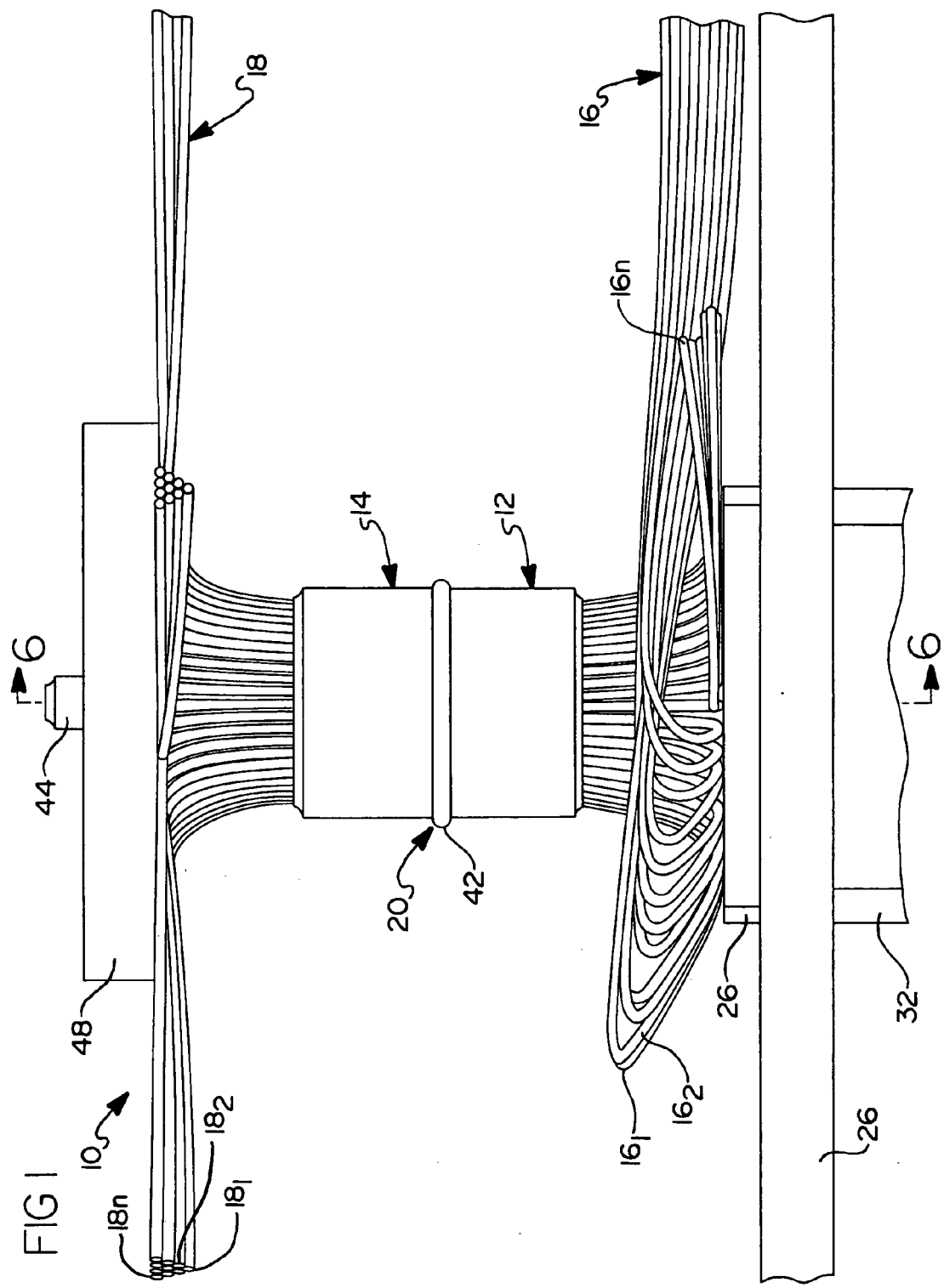
FIG. 1 is a side view of a coupler apparatus in accordance with a preferred embodiment of the present invention.

Referring to FIG. 1, there is shown an optical coupler apparatus 10 in accordance with a preferred embodiment of the present invention. The optical coupler apparatus 10 is particularly useful for enabling an optical coupling to be made between a first, non-rotating component and a second, rotating component, where one or more optical fibers are arranged along a periphery of each of the components. The present invention eliminates the need for converting optical signals into electrical signals at the coupling interface area, and then back into optical signals, before the coupling can be made.

Referring further to FIG. 1, the apparatus 10 generally includes a fixed annular coupling member 12 and a movable annular coupling member 14. The two annular coupling members 12 and 14 are arranged along a common longitudinal axis in facing relationship. In one implementation, the annular coupling members 12 and 14 have a common diameter.

With further reference to FIG. 1, each of the annular coupling members 12 and 14 supports a plurality of fiber optic bundles. In this example, annular coupling member 12 supports fiber optic bundles $16_1$–$16_n$ of a first fiber optic bundle assembly 16 which form an input optical fiber bundle assembly that receives optical signals from an external light source (not shown). The annular coupling member 14 similarly supports a second plurality of optical fiber bundles $18_1$–$18_n$ that form a second fiber optic bundle assembly 18. Fiber optic bundle assembly 18 receives optical signals transmitted through optical fiber bundle assembly 16 and coupled into the optical fiber bundle 18, which are then passed to one or more external components. The optical coupling occurs at an interface area 20 without any physical contact between the two annular coupling members 12 and 14.

Figure 2:
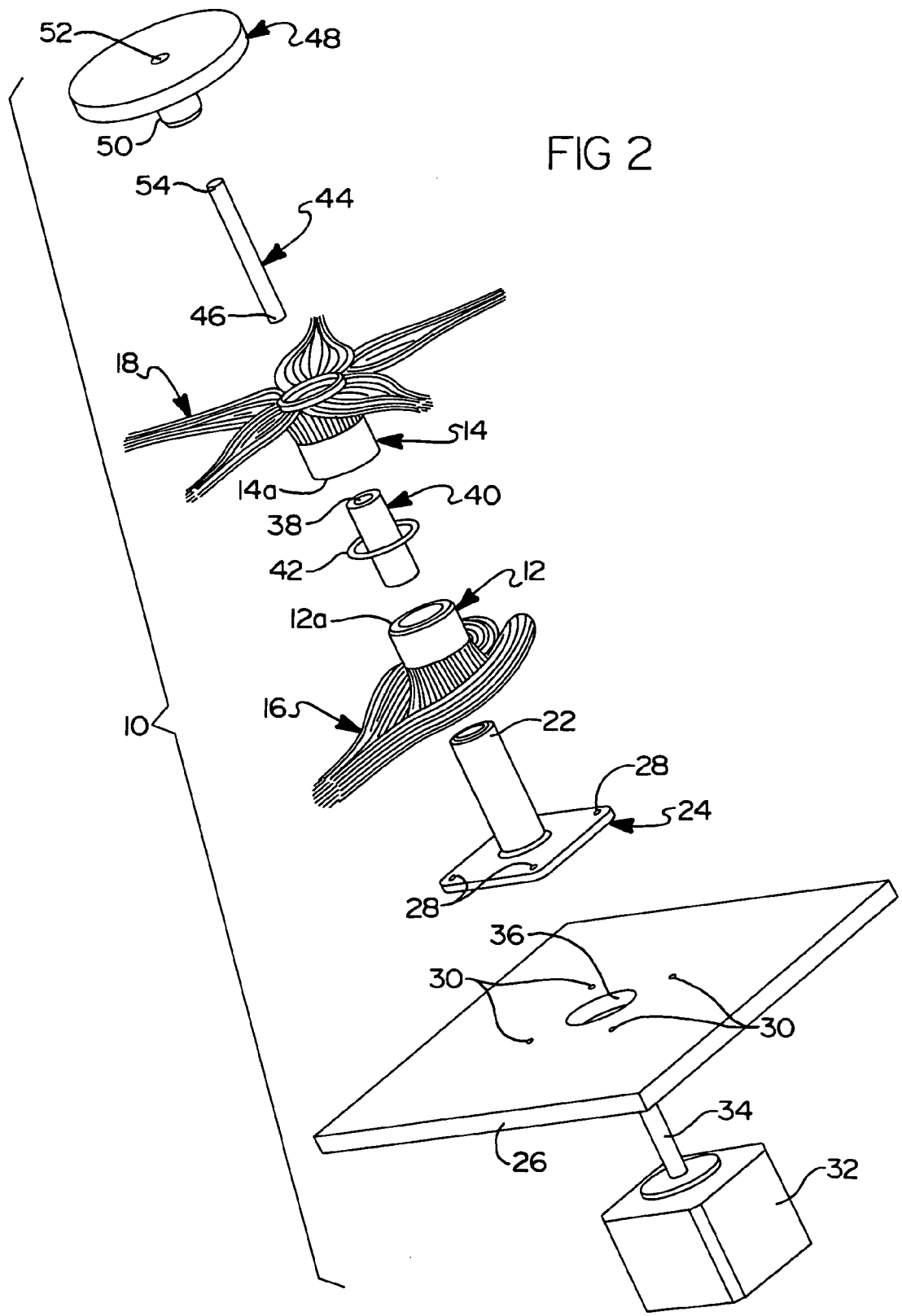
FIG. 2 is an exploded perspective view of the various components of the coupler apparatus of FIG. 1.

Referring now to FIG. 2, the construction of the apparatus 10 and its independent components can be seen in greater detail. Fixed annular coupling member 12 forms a donut-like shape and is supported on a bushing portion 22 of a mounting platform 24. The support platform 24 is secured to a support structure 26 via a plurality of suitable fasteners (not shown) that extend through holes 28 in the support platform 24 and holes 30 formed in the support structure 26. In this implementation a motor, preferably a stepper motor 32, having an output shaft 34 is disposed adjacent the support structure 26 such that the output shaft 34 projects through an opening 36 in the support structure 26 and through the bushing portion 22 of the support platform 24.

With further reference to FIG. 2, the output shaft 34 of the motor 32 extends into a bore 38 of a cylindrical shaft coupler 40. Preferably, the output shaft 34 extends into the bore 38 of the shaft coupler 40 about one quarter to one half of the overall length of the shaft coupler 40. A set screw (not shown) may be used to secure the output shaft 34 to the shaft coupler 40 so that the output shaft can drive the shaft coupler rotationally. Alternatively, the output shaft 34 can simply be press fit into the bore 38.

Disposed around the shaft coupler 40 is a seal 42. The seal is comprised of an elastomeric material and has an inner diameter that is preferably just slightly larger than the outer diameter of the circle formed by the outermost ends of the optical fibers of fiber bundle 16 and 18 at the interface area 20. The seal 42 thus forms a means for blocking out dirt or debris from entering between the mating faces of the annular coupling members 12 and 14.

Referring further to FIGS. 2 and 6, annular coupling member 14 receives a shaft 44 therethrough with a portion of the shaft being inserted within the bore 38 in the shaft coupler 40. End 46 of the shaft 44 is inserted into the shaft coupler 40 preferably about one quarter to one half of the total length of the shaft coupler and may be fixedly secured to the shaft coupler by a set screw or simply press fit into the bore 38. A hub 48 having a neck portion 50 with a bore 52 and an enlarged internal area 53 is press fit onto an upper end 54 of the shaft 44 or otherwise secured to the shaft with a set screw (not shown).

Neck portion 50 receives a portion of the annular coupling member 14 in the enlarged internal area 53. The annular coupling member 14 is preferably secured via set screw (not shown) to the neck portion 50 and to the upper end 54 of the shaft coupler 40. As such, rotation of the output shaft 34 of the motor 32 causes a corresponding rotation of the shaft coupler 40, which in turn causes a corresponding rotation of the second annular coupling member 14 and hub 48. Hub 48 helps to secure the first and second annular coupler members 12 and 14, respectively, closely adjacent one another.

Referring further to FIGS. 1, 2 and 6, the arrangement described above places a face portion 12a of the first annular coupling member 12 and a face portion 14a of the second annular coupling member 14 closely adjacent one another but while maintaining a very small distance between the two face portions. As seen in FIGS. 2 and 6, the face portions 12a and 14a have the same diameter and rotate about a common longitudinal axis. However, it will be appreciated that the invention is not so limited. For example, the invention could be used to couple optical signals from a first annular member having a first diameter to a second annular member having a second diameter that differs from the first diameter, so long as the two annular members are arranged to have at least some degree of overlap. Alternatively, the present invention can be used to couple optical signals between two annular coupling members that are rotating in different directions. Essentially any arrangement where the optical fibers of one optical fiber bundle can be arranged in at least a partial circular arrangement, or a complete circular arrangement, and need to be optically coupled, without a physical mechanical connection, to the optical fibers of a second optical fiber bundle that is also arranged in at least a partial circular arrangement, is anticipated to fall within the scope of the present invention.

Referring to FIGS. 3 and 4, the face portion 12a of the first annular coupling member 12 can be seen. Each of the optical fiber bundles $16_1$–$16_n$ is arranged about a circular path. The diameter of each one of the optical bundles $16_1$–$16_n$, and the total number of optical bundles $16_1$–$16_n$ arranged to form the face portion 12a principally determines the minimum required diameter of the face portion 12a. The arrangement of the second optical fiber bundle assembly 18 about the second annular coupling member 14 is essentially identical to that shown in FIGS. 3 and 4.

Figure 5:
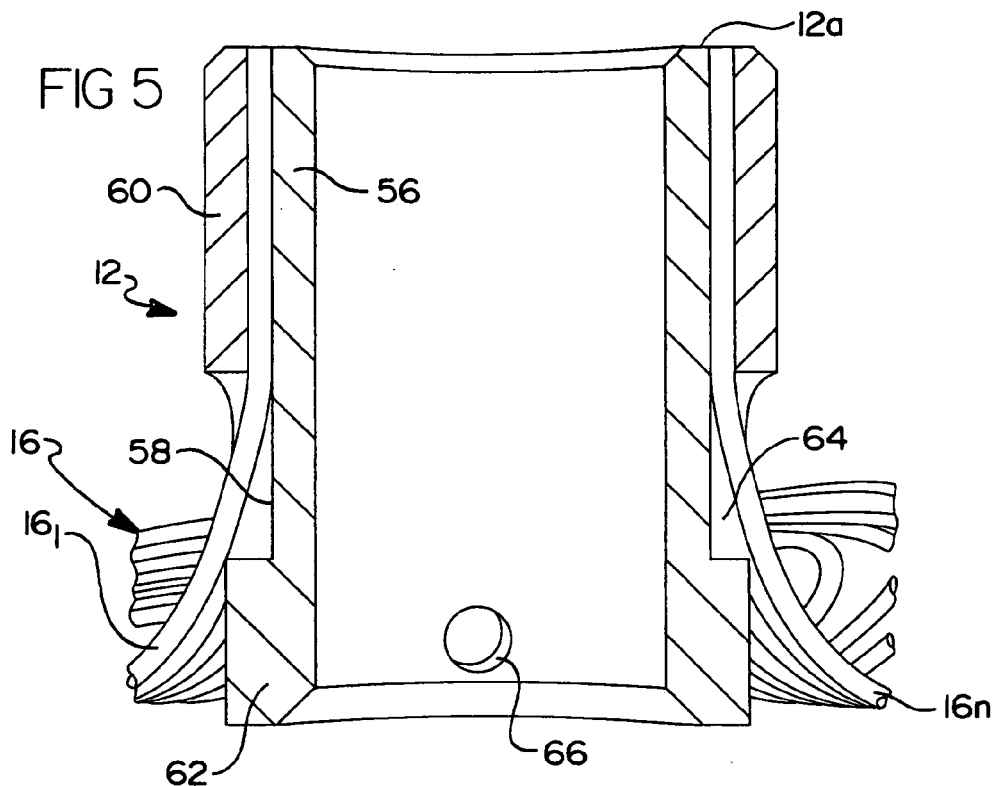
FIG. 5 is a cross sectional view taken in accordance with section line 5—5 in FIG. 3 illustrating the construction of the non-movable annular member, which is also identical to that of the movable annular member.

Referring now to FIG. 5, the construction of annular coupling member 12 can be seen in greater detail. It will be appreciated immediately that the construction of annular coupling member 14 is identical to that of coupling member 12, and will therefore not be described. Since coupling members 12 and 14 are identical, this further simplifies the cost of the apparatus 10 as both coupling members 12 are interchangeable.

The annular coupling member 12 includes a tubular portion 56 having an outer surface 58. The optical fiber bundles $16_1$–$16_n$ are arranged circumferentially around the outer surface 58. An outer sleeve member 60 is secured around the individual optical fiber bundles $16_1$–$16_n$ so as to slightly compress and securely hold the fiber bundle $16_1$–$16_n$ in contact with one another, and also tightly to the outer surface 58 of the tubular member 56. In one preferred implementation the tubular sleeve 60 comprises a ferrule that is secured to the tubular member 56 by hot swaging. Briefly, hot swaging is a well known process by which one or more bundles of optical fibers can be secured in a manner that reduces the interstitial area between the individual fibers in each bundle. This is accomplished by compressing the bundle in a heated condition. This is typically done by heating the bundle while the bundle is disposed within a swagable ferrule. The ferrule may comprise a stainless steel ferrule, a brass ferrule, an aluminum ferrule, etc. which captivates the fibers within an interior area of the swagable ferrule. Through the swaging forming process the ferrule is compressed, which in turn squeezes and compacts the portions of the individual optical fibers held within the interior area of the ferrule. This squeezing of the ferrule compacts and deforms the circular cross sectional shape of each optical fiber bundle $16_1$–$16_n$ into somewhat of a hexagonal shape. As a result, the interstitial area between individual optical fibers, as well as between adjacent optical fiber bundles $16_1$–$16_n$, is reduced. This helps to create a more efficient coupling because the light that would usually be lost in the interstitial areas of each of bundle assemblies 16 and 18 can be coupled from one to the other.

With further reference to FIG. 5, a shoulder portion 62 is formed on the outer surface 58 of the tubular member 56 such that a gap 64 is formed between sleeve member 60 and shoulder portion 62. The gap 64 enables outermost ends of each of the optical fiber bundles $16_1$–$16_n$ to be arranged around the outer surface 58 of the tubular member 56 during the manufacturing process. Alternatively, the shoulder portion 62 could comprise a second independent ferrule or sleeve-like component that is press fit or otherwise secured to the tubular member 56.

FIG. 5 also illustrates that a hole 66 is formed in the tubular member 56. Hole 66 may be threaded and used to enable a set screw or other like component to secure the tubular member 56 to the neck 22 of the bushing 24. For annular coupling member 14, opening 66 is used to enable the annular coupling member 14 to be fixedly secured to a portion of the shaft coupler 40.

A principal advantage of the present invention is that the annular construction of the annular coupling members 12 and 14 allow these components to be placed over an existing shaft and either secured to the shaft so as to enable rotation with the shaft, or alternatively secured to other surrounding structure to permit an annular coupling member 12 or 14 to be held fixedly. In either event, an optical coupling is made between the face portions 12a and 14a of the annular coupling members 12 and 14 without the need to use the area that is occupied by the shaft itself. Additionally, the apparatus 10 is inherently more efficient than previous optical coupling assemblies which require an optical signal to be converted into an electrical signal, and then re-converted back into an optical signal, when being transmitted from a first fiber optic bundle to a second fiber optic bundle.

The tubular member 56 is preferably made from a suitable metal such as brass, aluminum or steel, although it will be appreciated that other materials such as possibly plastic could also be used to form this component. The sleeve 62 is similarly formed preferably from brass, aluminum, steel or any other suitable material and may be secured by being press fit onto the tubular member 56, secured by an adhesive, a set screw, or any other suitable means.

It will also be appreciated that while the annular coupling members 12 and 14 have been shown as circular components, that each of these components could be split in half (or three or more sub-portions) such that the two halves form the complete annular coupling member 12 or 14. This would allow each of the annular coupling members 12 and 14 to be retrofitted onto a shaft of an existing system component without the need to disassemble the existing component in order to integrate the coupler apparatus 10 thereon.

Figure 7:
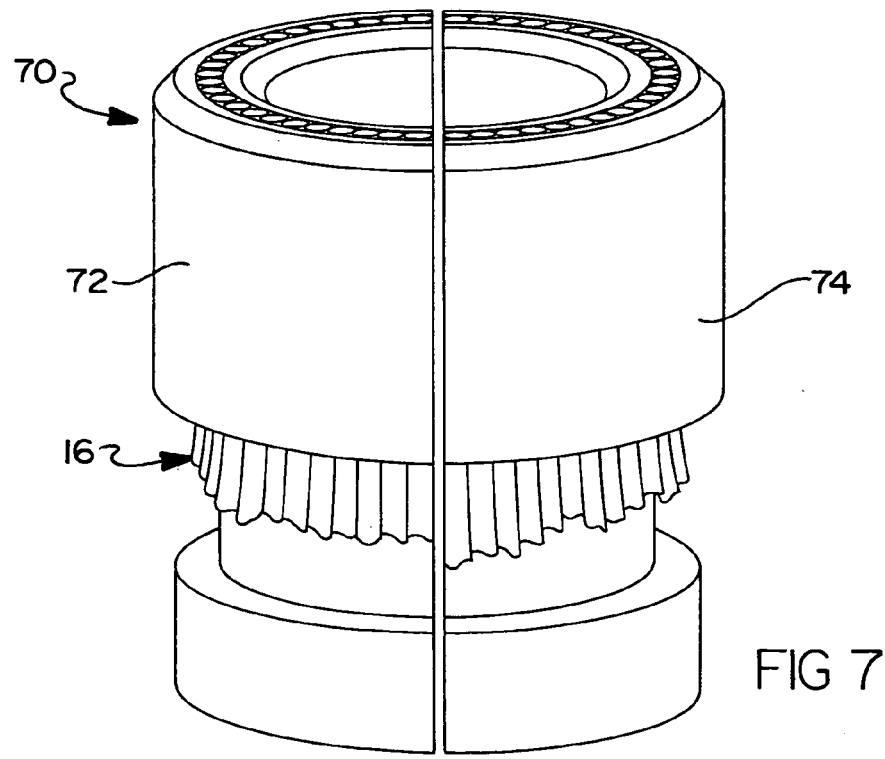
FIG. 7 is a perspective view of an optical coupling member in accordance with an alternative preferred embodiment of the present invention.

With brief reference to FIG. 7, an alternative preferred coupling member 70 is illustrated that embodies this feature. Annular coupling member 70 is formed from semi-circular coupling components 72 and 74 that are placed adjacent one another to form the optical coupler member 70. A slight spacing is illustrated between the two members 72 and 74 to better illustrate that these are formed as separate components. In practice, components 72 and 74 are preferably placed in physical contact such that no gap exists therebetween, and are secured by adhesives or by any suitable hose-type clamp or other suitable securing means.

What is claimed is:

1. An optical coupling apparatus for optically coupling a first, rotationally moveable optical component with a second, non-rotating optical component to enable an optical signal to be transmitted between said first and second optical components, said apparatus comprising:
   a first annular member for supporting an outer most end of said first optical component in at least a partial circular arrangement;
   a second annular member for supporting an outer most end of said second optical component in at least a partial circular arrangement, said first and second annular members being longitudinally aligned with one another along a longitudinal axis;
   wherein a face portion of each of said annular members are placed in facing relationship to enable said first, rotationally moveable optical component to be optically coupled to said second non-rotating optical component without physical contact therebetween; and
   a coupling structure extending within both of said annular members to maintain said annular members longitudinally aligned with said longitudinal axis.

2. The apparatus of claim 1, wherein said first annular member includes an annular channel formed therein for supporting an outermost end of said first optical component in at least a partial circular arrangement.

3. The apparatus of claim 1, wherein said second annular member includes an annular channel formed therein for supporting an outer most end of said second optical component in at least a partial circular arrangement.

4. The apparatus of claim 1, wherein said coupling structure comprises a bushing adapted to extend within both of said annular members to maintain said annular members in longitudinal alignment along said longitudinal axis.

5. The apparatus of claim 1, further comprising a motor having an output shaft, said output shaft extending along said longitudinal axis through each of said annular members and being fixedly coupled to said first, rotationally moveable optical component for rotating said first, rotationally moveable optical component.

6. An optical coupling apparatus for optically coupling a first, non-rotating optical component with a second, rotating optical component, comprising:
   a first annular member for supporting an output end of said first optical component in at least a partial circular pattern, said first annular member receiving an input optical signal from said first optical component;
   a second annular member for supporting an input end of said second optical component in at least a partial circular pattern, said second annular member being disposed along said longitudinal axis and adjacent said first annular member and being rotatable about said longitudinal axis;
   a motor having an output shaft operatively coupled to said first annular member for rotating said first annular member relative to said second annular member; and
   wherein said first and second annular members cooperatively couple said input signal from said first optical component to said second optical component.

7. The apparatus of claim 6, wherein each of said annular members has a face portion that faces the other.

8. The apparatus of claim 7, wherein said second annular member comprises:
an annular slot formed therein;
wherein said annular slot opens into a notched area extending circumferentially around an outer surface of the second annular member; and
wherein said input end of said second optical component extends through said notched area into said annular slot such that an outermost end of said input end is disposed parallel to said longitudinal axis.

9. The apparatus of claim 8, further comprising a circular seal circumscribing said face portions.

10. The apparatus of claim 6, wherein said first annular member comprises:
an annular slot formed therein;
wherein said annular slot opens into a notched area extending circumferentially around an outer surface of the first annular member; and
wherein said output end of said first optical component extends through said notched area into said annular slot such that an outermost end of said input end is disposed parallel to said longitudinal axis.

11. The apparatus of claim 6, further comprising a shaft for extending partially within each of said annular members for assisting in maintaining alignment of said annular members along said longitudinal axis.

12. An optical coupling apparatus for optically coupling a first, rotationally moveable optical fiber bundle with a second, non-rotating optical fiber bundle, comprising:
a first annular member for supporting an outermost end of said first optical fiber bundle in a circular pattern, said first annular member being rotatable about a longitudinal axis;
a second annular member for supporting an outermost end of said second optical fiber bundle in a circular pattern, said second annular member being disposed along said longitudinal axis and adjacent said first annular member, but spaced from said first annular member such that no physical contact occurs between said outermost ends of said fiber optic bundles; and
a shaft for extending through both of said annular members for maintaining both of said annular members aligned along a common longitudinal axis.

13. The apparatus of claim 12, further comprising a motor having an output shaft operatively coupled to one of said first and second annular members for rotating said one of said annular members relative to the other.

14. The apparatus of claim 12, wherein said first annular member comprises:

an annular body having an annular slot formed therein, said annular slot opening onto a face portion of said annular body;
a notch formed on an outer surface of said annular body and in communication with said annular slot; and
wherein said outermost end of said first optical fiber bundle extends through said notch and said annular slot such that said outermost end of said first optical fiber bundle is exposed on said face portion.

15. The apparatus of claim 12, wherein said second annular member comprises:
an annular body having an annular slot formed therein, said annular slot opening onto a face portion of said annular body;
a notch formed on an outer surface of said annular body and in communication with said annular slot; and
wherein said outermost end of said second optical fiber bundle extends through said notch and said annular slot such that said outermost end of said second optical fiber bundle is exposed on said face portion.

16. A method for optically coupling signals from a first optical fiber bundle into a second optical fiber bundle, comprising:
arranging an outermost end of said first optical bundle in at least a partial circular path about a longitudinal axis;
arranging an outermost end of said second optical bundle in at least a partial circular path about said longitudinal axis;
disposing said optical bundles such that said outermost ends are spaced adjacent one another along said longitudinal axis but not in physical contact;
supplying an optical input signal to one of said optical fiber bundles;
coupling optical signals from said one of said optical fiber bundles into the other; and
using a shaft disposed within said optical bundles, and aligned with common longitudinal axis of rotation of said optical bundles, to maintain said optical bundles concentrically aligned with one another during rotation of at least one of the optical bundles.

17. The method of claim 16, further comprising:
using an annular member to support said outermost end of said first optical fiber bundle.

18. The method of claim 16, further comprising:
using an annular member to support said outermost end of said second optical fiber bundle.

* * * * *